(12) United States Patent
Wikel et al.

(10) Patent No.: US 7,340,221 B2
(45) Date of Patent: Mar. 4, 2008

(54) ADAPTER FOR A MODULAR WIRELESS COMMUNICATION DEVICE

(75) Inventors: Harold L. Wikel, Muskego, WI (US); Jon Godston, Chicago, IL (US)

(73) Assignee: Motorola Inc, Schaumburg, IL (US)

( * ) Notice: Subject to any disclaimer, the term of this patent is extended or adjusted under 35 U.S.C. 154(b) by 332 days.

(21) Appl. No.: 10/940,180

(22) Filed: Sep. 14, 2004

(65) Prior Publication Data

US 2006/0057973 A1   Mar. 16, 2006

(51) Int. Cl.
*H04B 1/38* (2006.01)
(52) U.S. Cl. .................. 455/90.3; 455/41.2
(58) Field of Classification Search ........... 455/575.2, 455/90.1–90.3, 41.2, 41.3
See application file for complete search history.

(56) References Cited

U.S. PATENT DOCUMENTS 6,681,022 B1 * 1/2004 Puthuff et al. .............. 381/338
2002/0043545 A1 * 4/2002 Tang ........................... 224/600
2003/0104842 A1 * 6/2003 Choi et al. ................... 455/569
2004/0180631 A1 * 9/2004 Lim et al. ................... 455/90.3

FOREIGN PATENT DOCUMENTS

WO    WO 03/103255 A1    12/2003
WO    WO 03103255 A1 *  12/2003

* cited by examiner

Primary Examiner—Philip J. Sobutka
(74) Attorney, Agent, or Firm—Gary J. Cunningham

(57) ABSTRACT

An adapter for a modular wireless communication device. The adapter can include a lanyard, a cradle coupled to the lanyard, the cradle configured to support a short range wireless communication module, the cradle including an audio plug configured to provide a connection to the short range wireless communication module when the short range wireless communication module is coupled to the cradle, a microphone coupled to the lanyard and the audio plug, and a speaker coupled to the lanyard and the audio plug.

10 Claims, 5 Drawing Sheets

ADAPTER FOR A MODULAR WIRELESS COMMUNICATION DEVICE

CROSS-REFERENCE TO RELATED APPLICATIONS

This application is related to application entitled "Adapter for a Modular Wireless Communication Device," Motorola case number CS24887RL, filed on even date herewith and commonly assigned to the assignee of the present application, which is herein incorporated by reference.

BACKGROUND

1. Field

The present disclosure is directed to an adapter for a modular wireless communication device. For example, the present disclosure is directed to a lanyard headset adapter for securing a modular wireless communication device to a lanyard.

2. Description of Related Art

Presently, there are products related to wearable hands-free wireless communication devices. Unfortunately, they have limitations. In particular, none of these products provide allow easy removal of the wireless capability for re-use in other applications, such as a safety helmet, a clothing clip, or other applications. More particularly, there is no wireless communication device currently available that can be used as a neck lanyard and then be easily adapted for re-use in other wearable applications. The present devices do not provide for a modular approach for the ability to seamlessly transition between multiple environments while maintaining a continuous connection to another linked device, such as a cellular phone. Thus, the present devices do not allow the owner of the devices to maximize the owner's investment. The present disclosure can solve these, as well as other problems.

SUMMARY

An adapter for a modular wireless communication device. The adapter can include a lanyard, a cradle coupled to the lanyard, the cradle configured to support a short range wireless communication module, the cradle including an audio plug configured to provide a connection to the short range wireless communication module when the short range wireless communication module is coupled to the cradle, a microphone coupled to the lanyard and the audio plug, and a speaker coupled to the lanyard and the audio plug.

BRIEF DESCRIPTION OF THE DRAWINGS

The embodiments of the present disclosure will be described with reference to the following figures, wherein like numerals designate like elements, and wherein.

DETAILED DESCRIPTION

Figure 1:
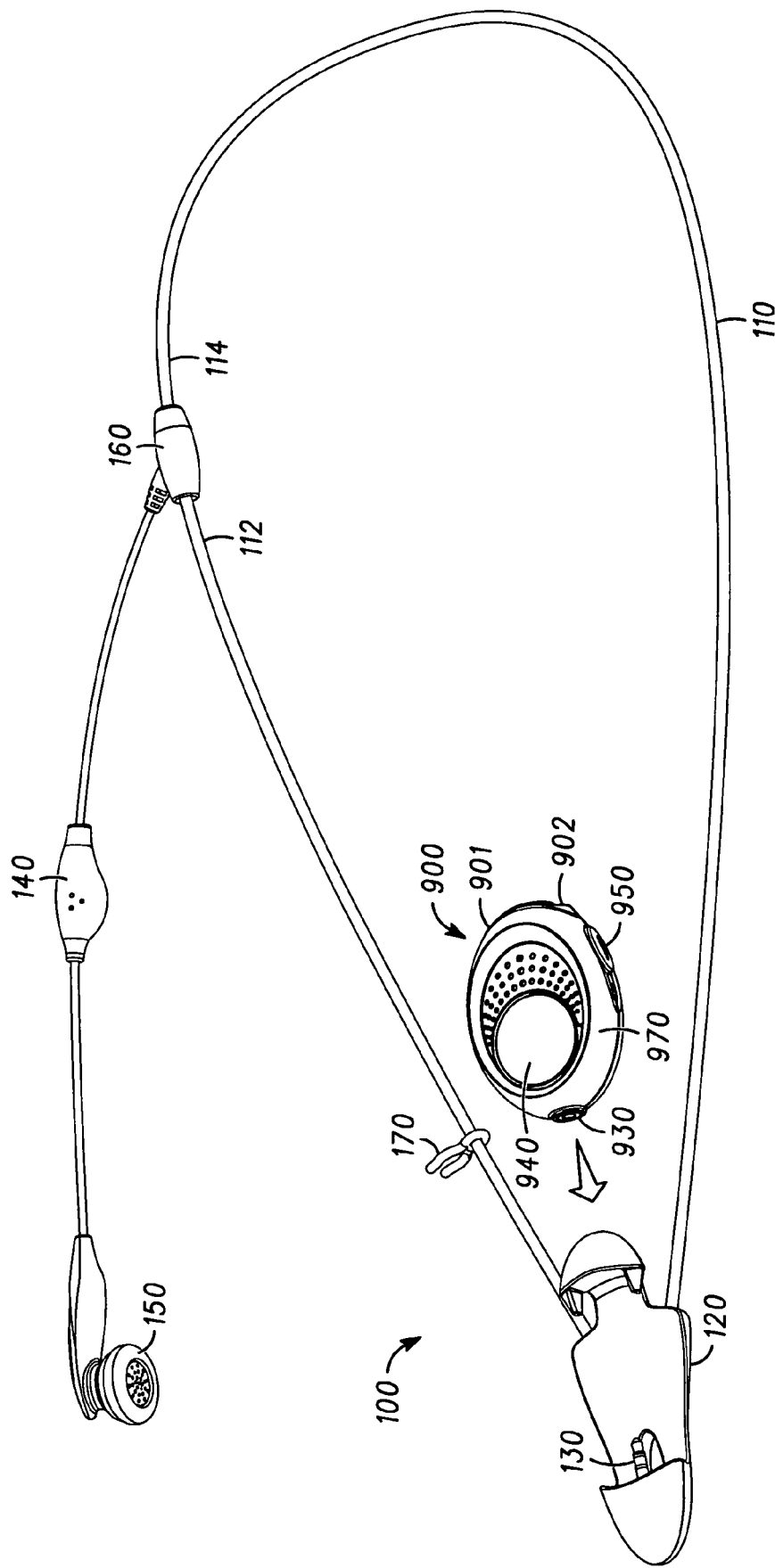
FIG. 1 is an exemplary illustration of an apparatus, such as an accessory for a modular wireless communication device, according to one embodiment.

FIG. 1 is an exemplary illustration of an apparatus 100, such as an accessory for a modular wireless communication device 900 according to one embodiment. The modular wireless communication device 900 can be a short range wireless communication module such as a Bluetooth device, an 802.11 wireless device, or any other device capable of short range wireless communications. The modular wireless communication device 900 is modular in the sense that it may only provide audio input and output and short range wireless communication functions. The apparatus 100 can include a lanyard 110, a cradle 120, an audio plug 130, a microphone 140, a speaker, such as an earbud 150, and a connector 160. The modular wireless communication device 900 can include a device housing 970, apertures 901 and 902 in the device housing 970, an audio input and output section 930 coupled to the housing 970, and actuation buttons 940 and 950 coupled to the housing 970. For example, the modular wireless communication device 900 can include a first actuation button 940, such as an activation button, and a second actuation button 950, such as a volume control button. The audio input and output section 930 can include a female audio input and output jack.

The lanyard 110 can be a flexible cord, a string, a tie, or any other means that can be worn around the neck of a user. The lanyard 110 can include a first end 112 and a second end 114 with the first end 112 detachably coupled to the second end 114 via the connector 160. Thus, die first end 112 can be detached from the second end 114 when a force is applied to the lanyard 110. The speaker 150 can be an earpiece, a speakerphone speaker, or any other device useful for providing audio output. The earpiece holder 170, such as a speaker or earbud holder, can be coupled to the lanyard 110 and detachably coupled to the speaker 150. The audio plug 130 can be a 2.5 millimeter audio plug.

The cradle 120 can be coupled to the lanyard 110 and can be configured to support the modular wireless communication device 900. The audio plug 130 can provide an electrical connection to the modular wireless communication device 900 via the audio input and output section 930 when the modular wireless communication device 900 is coupled to the cradle 120. The speaker 150 can be electrically coupled to the audio plug 130 and the microphone 140 can be electrically coupled to the audio plug 130.

Figure 2:
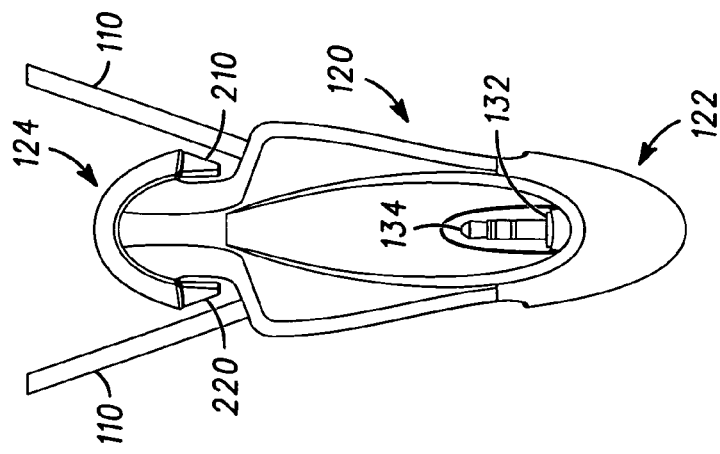
FIG. 2 is an exemplary front view of a cradle according to one embodiment.
Figure 3:
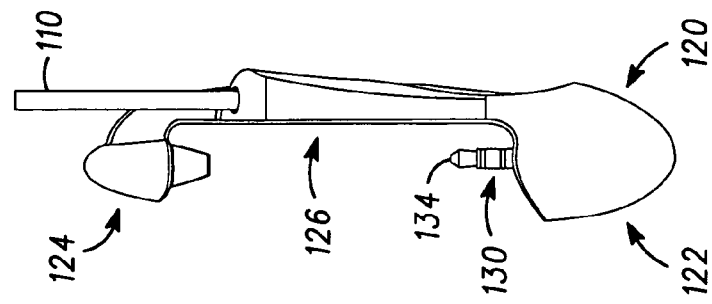
FIG. 3 is an exemplary first side view of the cradle according to one embodiment.
Figure 4:
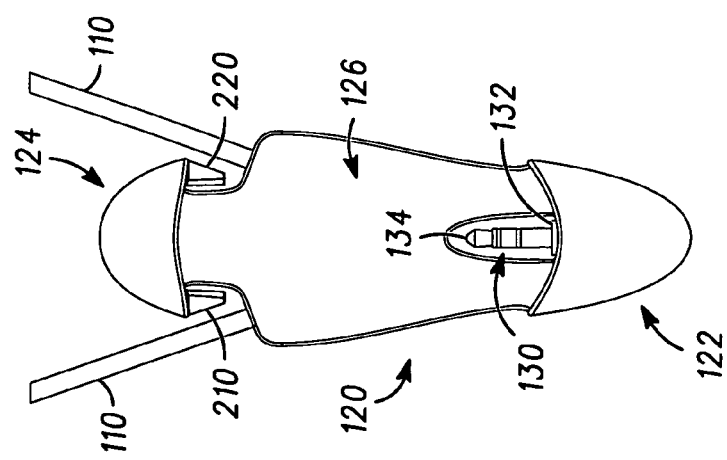
FIG. 4 is an exemplary back view of the cradle according to one embodiment.
Figure 5:
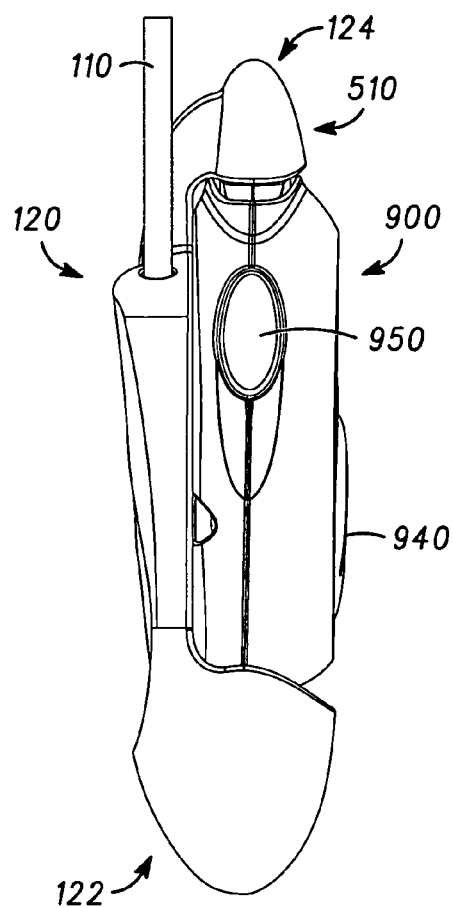
FIG. 5 is an exemplary second side view of the cradle including the modular wireless communication device according to one embodiment.
Figure 6:
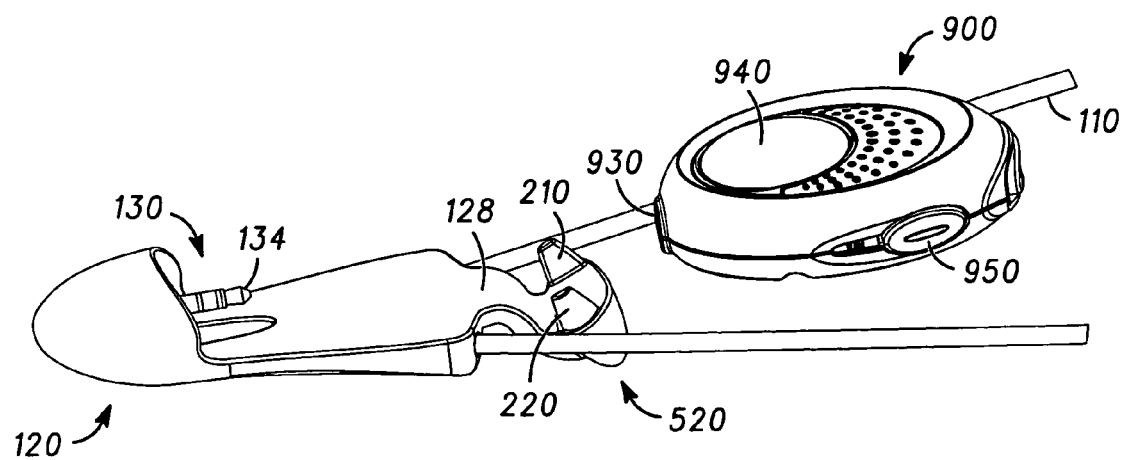
FIG. 6 is a perspective view of the cradle and the modular wireless communication device according to one embodiment.

FIG. 2 is an exemplary front view of the cradle 120 according to one embodiment. FIG. 3 is an exemplary first side view of the cradle 120 according to one embodiment. FIG. 4 is an exemplary back view of the cradle 120 according to one embodiment. FIG. 5 is an exemplary second side view of the cradle 120 including the modular wireless communication device 900 according to one embodiment. FIG. 6 is a perspective view of the cradle 120 and the modular wireless communication device 900 according to one embodiment. The cradle 120 can include a first cradle end 122, a second cradle end 124 at an opposite end of the cradle 120 from the first cradle end 122, and a cradle inner portion 126. The second cradle end 124 can be a secure mechanism configured to hold the modular wireless communication device 900 in the cradle 120 when the modular wireless communication device 900 is inserted into the cradle inner portion 126. For example, the second cradle end 124 can include a first pin 210 extending into the cradle inner portion 126 from the second cradle end 124 and a second pin 220 extending into the cradle inner portion 126 from the second cradle end 124. The first pin 210 and the second pin 220 can detachably couple to apertures 901 and 902 in the modular wireless communication device 900. The second cradle end 124 can include a flexible portion 128 configured to bend to allow insertion of the modular wireless communication device 900 into the cradle inner portion 126. For example, the flexible portion can have a first position 510 and a second position 520, the second position 520 allowing insertion of the modular wireless communication device 900 into the cradle 120 and the first position 510 retaining the short range wireless communication device 900 after it is inserted into the cradle 120. The flexible portion 128 can then retain the modular wireless communication device 900 when the modular wireless communication device 900 is inserted into the cradle inner portion 126. The second cradle end 124 can also use any other means, such as a latch, to allow insertion and retention of the modular wireless communication device 900 in the cradle inner portion 126.

The audio plug 130 can include a first plug end 132 coupled to the first cradle end 122 and the audio plug 130 can include a second plug end 134 extending into the cradle inner portion 126 from the first cradle end 122. Thus, the audio plug 130 can detachably electrically couple to the audio input and output section 930 when the modular wireless communication device 900 is inserted into the cradle inner portion 126. For example, the audio plug 130 can detachably electrically couple to the audio input and output section 930 when the modular wireless communication device 900 is retained by the first cradle end 122 and the second cradle end 124.

Figure 7:
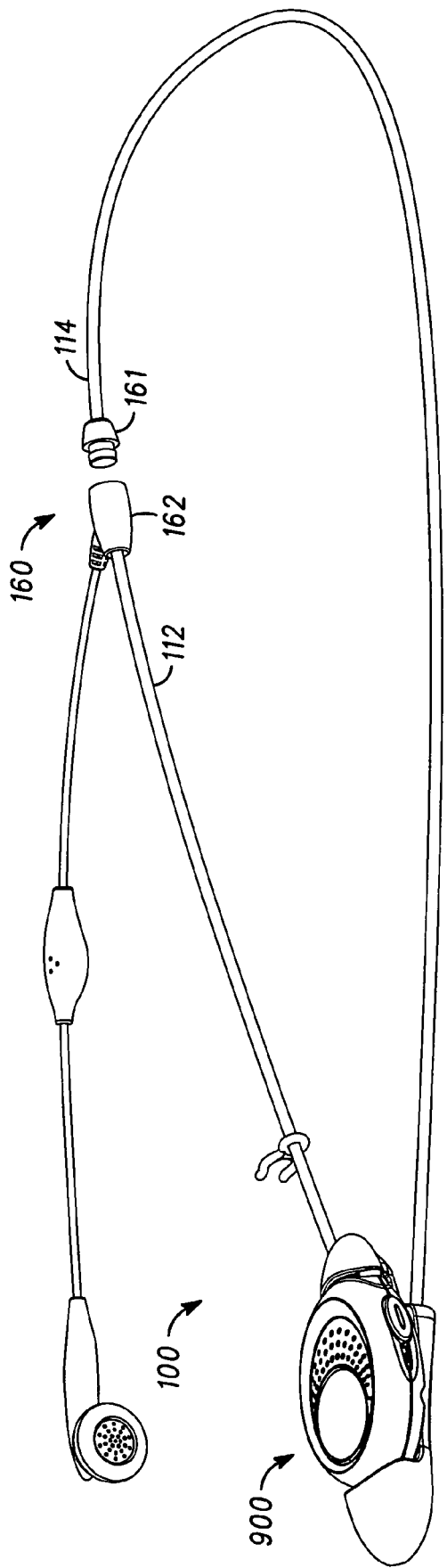
FIG. 7 is an exemplary illustration of the apparatus including the connector according to one embodiment.
Figure 8:
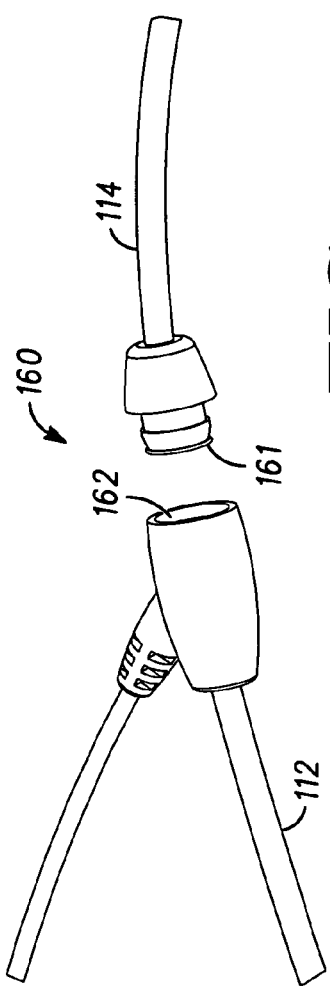
FIG. 8 is an exemplary close up illustration of the connector according to one embodiment.

FIG. 7 is an exemplary illustration of the apparatus 100 including the connector 160 according to one embodiment. FIG. 8 is an exemplary close up illustration of the connector 160 according to one embodiment. The connector 160 can include a male portion 161 coupled to the second end 114 of the lanyard 110 and a female portion 162 coupled to the first end of the lanyard 110. The male portion 161 can be detachably inserted into the female portion 162 to secure the first end 112 to the second end 114. The connector 160 can be configured to detach the first end 112 from the second end 114 when a force is applied to the lanyard 110 to prevent choking injury of a user wearing the lanyard 110.

Figure 9:
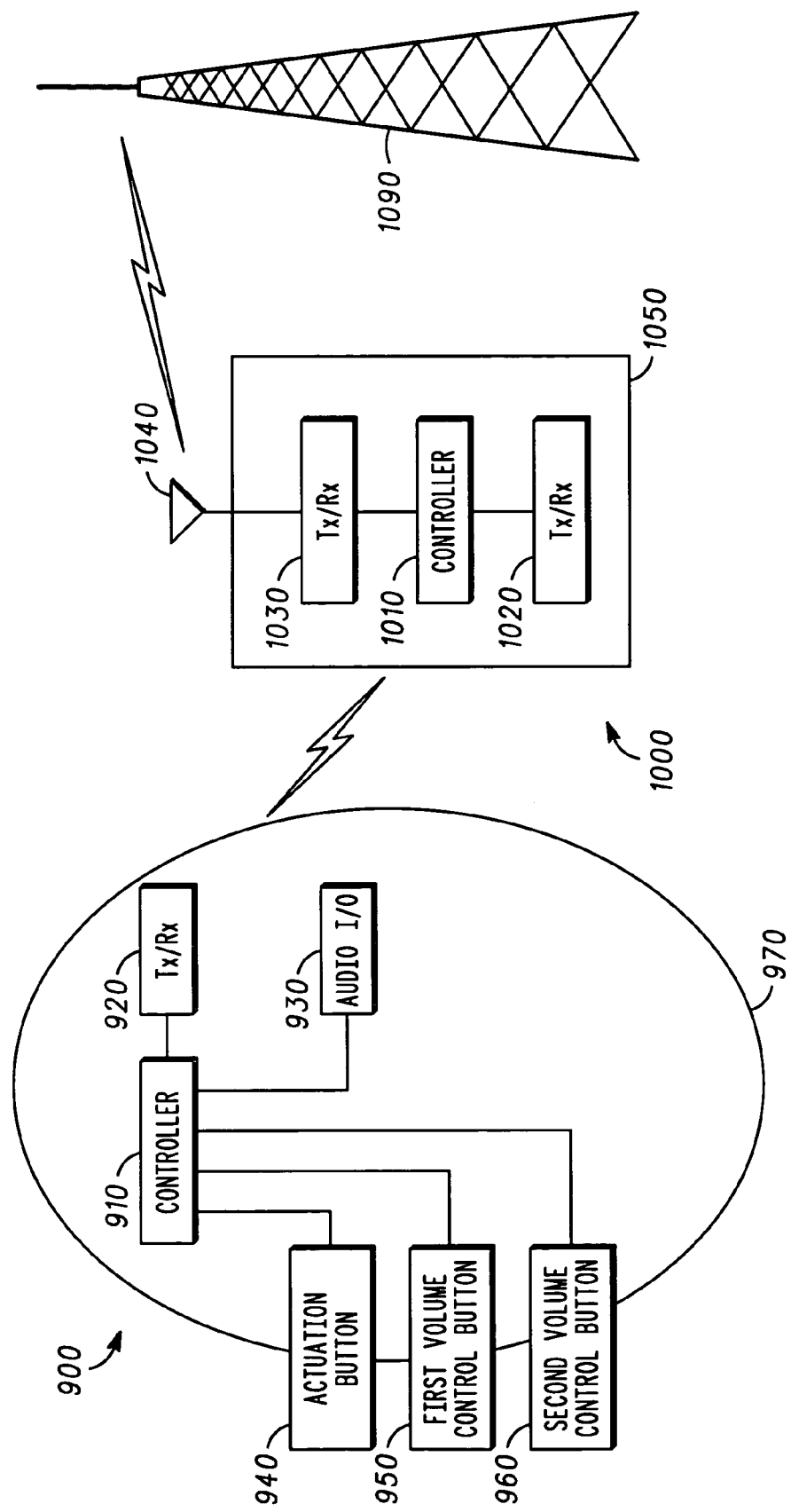
FIG. 9 is an exemplary illustration of a long range portable communication device wirelessly coupled to the modular wireless communication device according to one embodiment.

FIG. 9 is an exemplary illustration of a long range portable communication device 1000 wirelessly coupled to the modular wireless communication device 900 according to one embodiment. The long range portable communication device 1000 can be wirelessly coupled to the modular wireless communication device 900 using Bluetooth communication, using 802.11 communication, or using any other short range wireless communication. The modular wireless communication device 900 can include a controller 910, a short range wireless transceiver 920, an audio input and output section 930 that can include a female audio input and output jack, an actuation button 940, a first volume control button 950, and a second volume control button 960, all coupled to a device housing 970. The long range portable communication device 1000 can include a controller 1010, a short range wireless transceiver 1020, a long range wireless transceiver 1030, and an antenna 1040, all coupled to another device housing 1050. The long range portable communication device 1000 can be a wireless telephone, a cellular telephone, a personal digital assistant, a pager, a personal computer, a mobile communication device, or any other device that is capable of sending and receiving communication signals to and from a base station 1090 on a long range communication network such as a code division multiple access network, a time division multiple access network, a global system for mobile communication network, or any other long range wireless communication network. According to another embodiment, the modular wireless communication device 900 can be wirelessly coupled to a portable audio player having a short range wireless transceiver, another modular wireless communication device, or any other device having a having a short range wireless transceiver.

In operation, the controllers 1010 and 910 can control the operations of the respective devices. The actuation button 940 can actuate various functions of the modular wireless communication device 900. The volume control buttons 950 and 960 can control the volume of the modular wireless communication device 900. The audio input and output section 930 can send audio signals to and receive audio signals from the modular wireless communication device 900. The modular wireless communication device 900 can be coupled with the long range portable communication device 1000 by using the short range wireless transceiver 920 to transmit and receive short range wireless communication signals with the long range portable communication device 1000. The modular wireless communication device 900 can also communicate with other modular wireless communication devices or communication devices located on other helmets, such as a safety helmet on a passenger on a motorcycle. The short range wireless transceiver 1020 can send and receive signals to and from the modular wireless communication device 900. The long range transceiver 1030 can communicate with a long range wireless communication network via the antenna 1040 and the base station 1090.

Thus, for example, the present disclosure can provide for a portable electronic device that can enable generally hands-free wireless communication on a Wearable neck lanyard, which can be easily detached and used in other applications. The present disclosure provides for an apparatus 100 that can include a modular wireless communication device 900 such as a small, removable electronics control module that contains a short-range transceiver 920 and battery necessary to power and operate the circuitry enabling microphone input audio output, connection to long-range communication functions of a linked device, such as a cell phone, a MP3 player, a two-way radio, a CB radio, and a beeper, and short-range "intercom" communication, This module can also include buttons for accessing various functionality such as Send/End, volume control, etc., an audio jack for connecting to an industry-standard headset plug, a charging means for re-charging the battery, and an attachment point for enabling wearable applications. This module can make voice calls using voice-recognition dialing functionality. The apparatus 100 can also include a wearable neck lanyard 110 that physically retains the module and also creates an electrical connection to audio input and output devices integrated on the lanyard 110. The lanyard 110 can include a cradle 120, a microphone 140, an earbud 150, a breakaway section such as the connector 160, and an earbud holder 170. The cradle 120 can be comprised of a flexible material that allows easy docking or the module. The cradle 120 can also include integrated an industry-standard 2.5 mm audio plug 130 for providing a electrical interface to the module and ends of the lanyard cord 110 itself. The microphone 140 can provide audio input capabilities and can be electrically coupled to the cradle 120 via conductive wire. The earbud 150 can provide audio output capabilities and can be electrically coupled to the cradle 120 via conductive wire. The connector 160 can provide a safety mechanism to prevent choking injuries by quickly opening the lanyard cord 110 loop. The earbud holder 170 can provide a location to secure the earbud 150 to the lanyard 110 when the earbud 150 is not in use. Thus, the present disclosure can enhance the user experience by providing a wearable neck lanyard for communication that connects wirelessly to another linked device, such as a cell phone and also can allow seamless transition to other applications through its unique removable modular approach. Accordingly the present disclosure provides for the removable module to allow easy and continued seamless use of wireless communication capabilities in other wearable applications, such as a safety helmet, a clothing clip, or other devices. The present disclosure also provides for substantial reduction in size and weight over other devices. The present disclosure additionally provides for simple, easy-to-locate buttons for controlling the communications and entertainment capabilities. The present disclosure can be upgraded to newer technology and/or other various applications, such as broadcast radio, without changing the lanyard design. The present disclosure also provides for easy recharging of the module because it because module can he easily removed as a separate device.

The operations of the electronic devices of this disclosure are preferably implemented on a programmed processor. However, the controllers may also be implemented on a general purpose or special purpose computer, a programmed microprocessor or microcontroller and peripheral integrated circuit elements, an ASIC or other integrated circuit, a hardware electronic or logic circuit such as a discrete clement circuit, a programmable logic device such as a Programmable Logic Device (PLD), Programmable Logic Array (PLA), Field Programmable Gate Array (FPGA) or Programmable Array Logic (PAL), or the like. In general, any device on which resides a finite state machine capable of implementing the devices shown in the Figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the disclosure by simply employing the elements of the independent claims. Accordingly, the preferred embodiments of the disclosure as set forth herein are intended to be illustrative, not limiting. Various changes may be made without departing from the spirit and scope of the disclosure.

What is claimed is:

1. A short range wireless communication module apparatus comprising:
   a lanyard including a flexible cord;
   a cradle coupled to the flexible cord, the cradle including
      a first cradle end;
      a second cradle end, the first cradle end and the cradle second end configured to retain the short range wireless communication module; and
      an audio plug coupled to the second cradle end, the audio plug electrically coupled to the short range wireless communication module when the short range wireless communication module is retained by the first cradle end and the second cradle end;
   a microphone electrically coupled to the audio plug; and
   a speaker electrically coupled to the audio plug,
   wherein the short range wireless communication module accessory further comprises the short range wireless communication module detachably coupled to the cradle, the short range wireless communication module including a short range wireless transceiver,
   wherein the short range wireless communication module configured to wirelessly communicate with another wireless communication device only using short range peer-to-peer wireless communication signals using the short range wireless transceiver, and
   wherein the short range wireless communication module further includes a female audio input and output port coupled to the audio plug when the short range wireless communication module is coupled to the cradle.

2. The short range wireless communication module apparatus according to claim 1, wherein the first cradle end comprises a flexible portion having a first position and a second position the first position allowing insertion of the short range wireless communication module and the second position retaining the short range wireless communication module after it is inserted into the cradle.

3. The short range wireless communication module apparatus according to claim 2, wherein, when in the second position, the flexible portion includes
   a first pin extending into the cradle inner portion from the second cradle end; and
   a second pin extending into the cradle inner portion from the second cradle end.

4. The short range wireless communication module apparatus according to claim 1, wherein the flexible cord comprises
   a first cord end;
   a second cord end; and
   a connector coupled to the first cord end and the second cord end, the connector configured to detach the first cord end from the second cord end when a force is applied to the lanyard.

5. The short range wireless communication module apparatus according to claim 1, further comprising a speaker holder coupled to the flexible cord, the speaker holder configured to detachably couple the speaker to the flexible cord.

6. A lanyard comprising:
   a flexible cord;
   a cradle coupled to the flexible cord, the cradle including
      a first cradle end at one end of the cradle;
      a second cradle end at an opposite end of the cradle from the first cradle end;
      a cradle inner portion partially encompassed by the first cradle end and the second cradle end; and
      an audio plug coupled to the first cradle end, the audio plug extending into the cradle inner portion;
   a microphone electrically coupled to the audio plug;
   a speaker electrically coupled to the audio plug; and a short range wireless communication module detachably coupled to the cradle, the short range wireless communication module including a short range wireless transceiver, wherein the short range wireless communication module configured to wirelessly communicate with another wireless communication device only using short range peer-to-peer wireless communication signals using the short range wireless transceiver, and wherein the short range wireless communication module further includes a female audio input and output port coupled to the audio plug when the short range wireless communication module is coupled to the cradle.

7. The lanyard according to claim 6, wherein the second cradle end includes a flexible portion having a first position and a second position, wherein the flexible portion bends from the first position to the second position.

8. The lanyard according to claim 7, wherein, when in the first position, the flexible portion includes a first pin extending into the cradle inner portion from the second cradle end; and a second pin extending into the cradle inner portion from the second cradle end.

9. The lanyard according to claim 6, wherein the flexible cord comprises a first cord end;

a second cord end; and a connector coupled to the first cord end and the second cord end, the connector configured to detach the first cord end from the second cord end when a force is applied to the lanyard.

10. The lanyard according to claim 6, further comprising a speaker holder coupled to the flexible cord, the speaker holder configured to detachably couple the speaker to the flexible cord.

* * * * *